US012675907B2

(12) United States Patent　　(10) Patent No.: US 12,675,907 B2

Ji et al.　　(45) Date of Patent: Jul. 7, 2026

(54) METER RECOGNITION METHOD, APPARATUS, ELECTRONIC DEVICE, AND STORAGE MEDIUM

(71) Applicants:Beijing BOE Technology Development Co., Ltd., Beijing (CN); BOE Technology Group Co., Ltd., Beijing (CN)

(72) Inventors: Chao Ji, Beijing (CN); Hongxiang Shen, Beijing (CN); Ge Ou, Beijing (CN); Boran Jiang, Beijing (CN); Shuqi Wei, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 443 days.

(21) Appl. No.: 18/272,360

(22) PCT Filed: Oct. 15, 2021

(86) PCT No.: PCT/CN2021/124158

§ 371 (c)(1),
(2) Date: Jul. 14, 2023

(87) PCT Pub. No.: WO2023/060574

PCT Pub. Date: Apr. 20, 2023

(65) Prior Publication Data

US 2024/0320858 A1　　Sep. 26, 2024

(51) Int. Cl.
　*G06T 7/73*　　(2017.01)
　*G06T 7/11*　　(2017.01)
　*G06T 9/00*　　(2006.01)

(52) U.S. Cl.
　CPC ................. *G06T 7/75* (2017.01); *G06T 7/11* (2017.01); *G06T 9/00* (2013.01); *G06T 2207/20021* (2013.01); *G06T 2207/20081* (2013.01)

(58) Field of Classification Search
　CPC ..... G06T 7/75; G06T 7/11; G06T 9/00; G06T 2207/20021; G06T 2207/20081; G06V 10/454; G06V 10/82

(Continued)

(56) References Cited

U.S. PATENT DOCUMENTS

| | | | |
|---|---|---|---|
| 2020/0034436 A1 | 1/2020 | Chen et al. | |
| 2021/0142102 A1* | 5/2021 | Al Rashdan | G06V 10/225 |
| 2023/0120054 A1* | 4/2023 | Yang | G06T 7/50 |
| | | | 382/159 |

FOREIGN PATENT DOCUMENTS

| | | | | |
|---|---|---|---|---|
| CN | 110826549 A | * | 2/2020 | G06N 3/08 |
| CN | 113127631 A | | 7/2021 | |

(Continued)

OTHER PUBLICATIONS

Ashish Vaswani et al. "Attention is All You Need", 31st Conference on Neural Information Processing Systems (NIPS 2017), Long Beach, CA, USA, Dec. 6, 2017, 11 pages.

(Continued)

*Primary Examiner* — Jennifer Mehmood
*Assistant Examiner* — Pardis Sohraby
(74) *Attorney, Agent, or Firm* — IPro, PLLC

(57) ABSTRACT

The present disclosure relates to a meter recognition method, which includes: determining embedded features of pixels in a target image of a meter, and encoding position information of the pixels to obtain encoded position features; inputting superimposed features obtained by superimposing the encoded position features and the embedded (Continued)

features into an encoder of a target model; wherein an input of the target model includes the labels, and an output of the target model includes coordinates of key points in a sample image of the meter. According to the present disclosure, the image of the meter can be processed by the trained target model, the coordinates of key points in the target image of the meter are outputted. It can reduce manual operations and improve efficiency, and on the other hand, it can avoid possible misoperations during manual operations, which is beneficial for improving accuracy.

17 Claims, 5 Drawing Sheets

(58) Field of Classification Search
USPC .......................................................... 382/103
See application file for complete search history.

(56) References Cited

FOREIGN PATENT DOCUMENTS

| | | | | | |
|---|---|---|---|---|---|
| CN | 113221874 | A | * | 8/2021 | ............. G06N 3/044 |
| CN | 113469167 | A | * | 10/2021 | ............. G06N 3/045 |

OTHER PUBLICATIONS

PCT/CN2021/124158 international search report.
PCT/CN2021/124158 Written Opinion.

* cited by examiner

Figure 1:
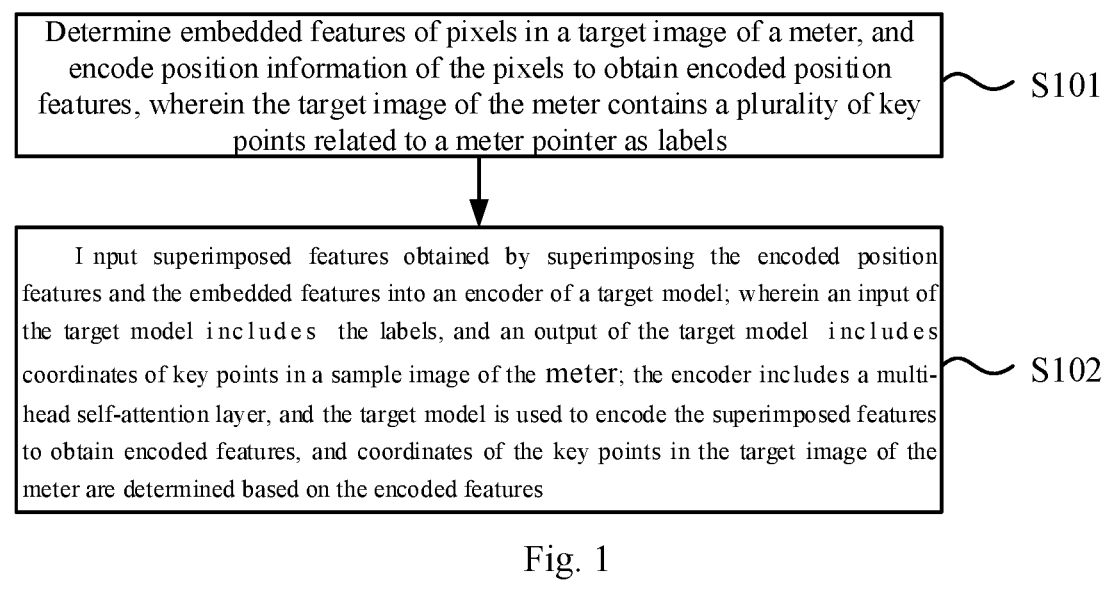

Determine embedded features of pixels in a target image of a meter, and encode position information of the pixels to obtain encoded position features, wherein the target image of the meter contains a plurality of key points related to a meter pointer as labels

~ S101

I nput superimposed features obtained by superimposing the encoded position features and the embedded features into an encoder of a target model; wherein an input of the target model includes the labels, and an output of the target model includes coordinates of key points in a sample image of the meter; the encoder includes a multi-head self-attention layer, and the target model is used to encode the superimposed features to obtain encoded features, and coordinates of the key points in the target image of the meter are determined based on the encoded features

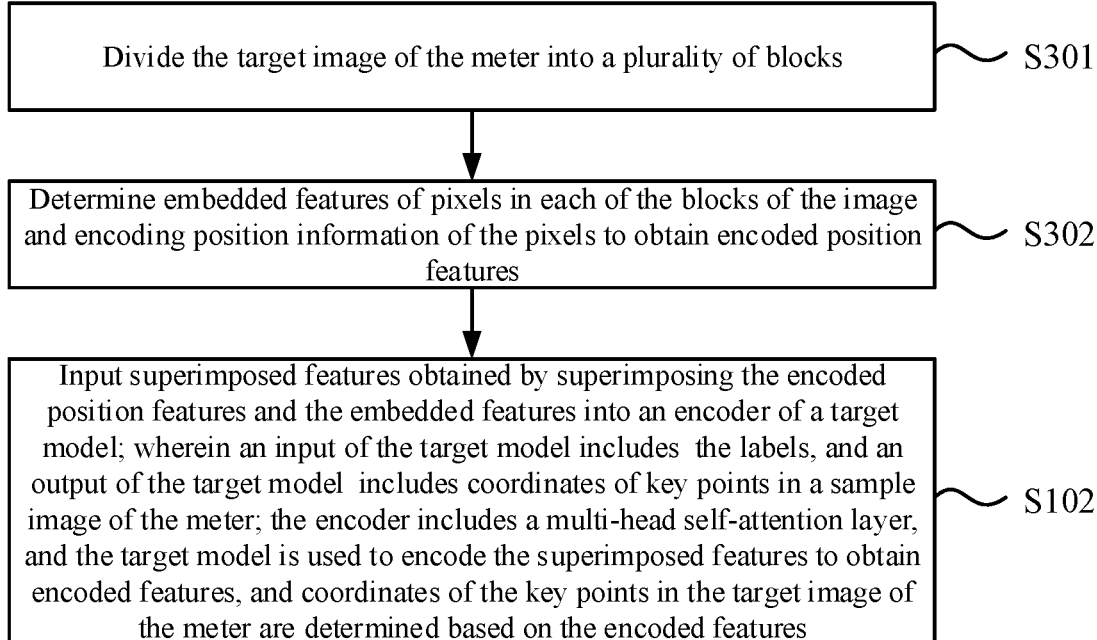

Divide the target image of the meter into a plurality of blocks    S301

Determine embedded features of pixels in each of the blocks of the image and encoding position information of the pixels to obtain encoded position features    S302

Input superimposed features obtained by superimposing the encoded position features and the embedded features into an encoder of a target model; wherein an input of the target model includes the labels, and an output of the target model includes coordinates of key points in a sample image of the meter; the encoder includes a multi-head self-attention layer, and the target model is used to encode the superimposed features to obtain encoded features, and coordinates of the key points in the target image of the meter are determined based on the encoded features    S102

Fig. 3

Image of meter

600

604 Memory

606 Power component

608 Multimedia component

610 Audio component

602 Processing component

1520 Processor

616 Communication component

614 Sensor component

612 I/O interface

METER RECOGNITION METHOD, APPARATUS, ELECTRONIC DEVICE, AND STORAGE MEDIUM

CROSS-REFERENCE TO RELATED APPLICATIONS

This application is a national stage of international PCT Application No. PCT/CN2021/124158, filed on Oct. 15, 2021, the entire contents of which are incorporated herein by reference.

TECHNICAL FIELD

The present disclosure relates to the field of display technology, and more particularly, to a meter recognition method, an apparatus, an electronic device, and a storage medium.

BACKGROUND

At present, meter reading operations are generally performed manually, and in some cases, the reading personnel need to personally walk to the location of the meter and observe the position of the pointer in the dial to read the value. Although in some cases images of the meter can also be first collected, it is still necessary to manually check the image of the meter to determine the position of the pointer in the dial to read the value.

Moreover, after the reading, it is necessary to record the reading, and both the reading and recording operations need to be completed manually. On the one hand, the efficiency is not high, and on the other hand, the accuracy is also not high.

SUMMARY

The present disclosure provides a meter recognition method, a meter recognition apparatus, an electronic device, and a computer-readable storage medium in order to solve the deficiency in the related art.

According to a first aspect of the embodiments of the present disclosure, there is provided a meter recognition method including:

determining embedded features of pixels in a target image of a meter, and encoding position information of the pixels to obtain encoded position features, wherein the target image of the meter contains a plurality of key points related to a meter pointer as labels;

inputting superimposed features obtained by superimposing the encoded position features and the embedded features into an encoder of a target model;

wherein an input of the target model includes the labels, and an output of the target model includes coordinates of key points in a sample image of the meter;

the encoder includes a multi-head self-attention layer, and the target model is used to encode the superimposed features to obtain encoded features, and coordinates of the key points in the target image of the meter are determined based on the encoded features.

Optionally, before inputting superimposed features obtained by superimposing the encoded position features and the embedded features into an encoder of a target model, the method further includes:

determining sample embedded features of pixels in the sample image of the meter, and encoding sample position information of the pixels to obtain encoded position features, wherein the sample image of the meter contains a plurality of sample key points related to the meter pointer as sample labels;

inputting sample superimposed features obtained by superimposing the sample encoded position features and the sample embedded features into the encoder to obtain the sample encoded features;

determining a training sample set based on obtaining the sample encoded features from the plurality of sample images of the meter;

training an initial model based on sample encoded features in the training sample set to obtain a target model, wherein the sample model includes the encoder, an input of the sample model includes the labels, and an output of the sample model at least includes coordinates of the sample key points in the sample image of the meter.

Optionally, the key points include at least one of: a starting position of a dial reading, an ending position of the dial reading, a midpoint position of the dial reading, a starting position of a meter pointer, and an ending position of the meter pointer.

Optionally, determining embedded features of pixels in a target image of a meter, and encoding position information of the pixels to obtain encoded position features including:

dividing the target image of the meter into a plurality of blocks;

determining embedded features of pixels in each of the blocks of the image and encoding position information of the pixels to obtain encoded position features.

Optionally, the encoder includes a plurality of sequentially connected sub-encoders, and the target model further includes a feature pyramid;

each of the sub-encoders outputs encoded results based on the input encoded features, and inputs the encoded results into the feature pyramid to obtain fused features, wherein size information corresponding to the encoded results output by each sub-encoder is different, and size information corresponding to the encoded features input to each sub-encoder is different.

Optionally, the output of the target model further includes at least one of: a type of the target image of the meter; coordinates of at least two diagonal points in an external quadrilateral of the meter in the target image of the meter.

Optionally, each of the sub-encoders is connected to a linear layer, the linear layer is used to reduce dimensionality of the encoded results output by the encoder and input the dimensionality reduced encoded results into a next sub-encoder.

Optionally, the target model includes a first target sub-model, a second target sub-model, and a third target sub-model;

wherein an input of the first target sub-model includes the fused features, and an output includes a type of the target image of the meter;

an input of the second target sub-model includes the fused features, and an output includes coordinates of at least two diagonal points in the external quadrilateral of the meter in the target image of the meter;

an input of the third target sub-model includes the fused features, and an output includes coordinates of the key points in the target image of the meter.

According to a second aspect of the embodiments of the present disclosure, there is provided a meter recognition apparatus, including one or more processors configured to perform:

determining embedded features of pixels in a target image of a meter, and encoding position information of the pixels to obtain encoded position features, wherein the target image of the meter contains a plurality of key points related to a meter pointer as labels;

inputting superimposed features obtained by superimposing the encoded position features and the embedded features into an encoder of a target model;

wherein an input of the target model includes the labels, and an output of the target model includes coordinates of key points in a sample image of the meter;

the encoder includes a multi-head self-attention layer, and the target model is used to encode the superimposed features to obtain encoded features, and coordinates of the key points in the target image of the meter are determined based on the encoded features.

Optionally, the processor is further configured to perform:

determining sample embedded features of pixels in the sample image of the meter, and encoding sample position information of the pixels to obtain encoded position features, wherein the sample image of the meter contains a plurality of sample key points related to the meter pointer as sample labels;

inputting sample superimposed features obtained by superimposing the sample encoded position features and the sample embedded features into the encoder to obtain the sample encoded features;

determining a training sample set based on obtaining the sample encoded features from the plurality of sample images of the meter;

training an initial model based on sample encoded features in the training sample set to obtain a target model, wherein the sample model includes the encoder, an input of the sample model includes the labels, and an output of the sample model at least includes coordinates of the sample key points in the sample image of the meter.

Optionally, the key points include at least one of: a starting position of a dial reading, an ending position of the dial reading, a midpoint position of the dial reading, a starting position of a meter pointer, and an ending position of the meter pointer.

Optionally, the processor is configured to perform:

dividing the target image of the meter into a plurality of blocks;

determining embedded features of pixels in each of the blocks of the image and encoding position information of the pixels to obtain encoded position features.

Optionally, the encoder includes a plurality of sequentially connected sub-encoders, and the target model further includes a feature pyramid;

each of the sub-encoders outputs encoded results based on the input encoded features, and inputs the encoded results into the feature pyramid to obtain fused features, wherein size information corresponding to the encoded results output by each sub-encoder is different, and size information corresponding to the encoded features input to each sub-encoder is different.

Optionally, each of the sub-encoders is connected to a linear layer, the linear layer is used to reduce dimensionality of the encoded results output by the encoder and input the dimensionality reduced encoded results into a next sub-encoder.

Optionally, the output of the target model further includes at least one of: a type of the target image of the meter; coordinates of at least two diagonal points in an external quadrilateral of the meter in the target image of the meter.

Optionally, the target model includes a first target sub-model, a second target sub-model, and a third target sub-model;

wherein an input of the first target sub-model includes the fused features, and an output includes a type of the target image of the meter;

an input of the second target sub-model includes the fused features, and an output includes coordinates of at least two diagonal points in the external quadrilateral of the meter in the target image of the meter;

an input of the third target sub-model includes the fused features, and an output includes coordinates of the key points in the target image of the meter.

According to a third aspect of the embodiments of the present disclosure, there is provided an electronic device including: a processor; a memory used to store a computer program; wherein when the computer program is executed by the processor, the meter recognition method according to any one of the above embodiments is implemented.

According to a fourth aspect of the embodiments of the present disclosure, there is provided a computer-readable storage medium for storing a computer program, wherein when the computer program is executed by a processor, steps in the meter recognition method according to any one of the above embodiments are implemented.

According to the embodiments of the present disclosure, the image of the meter can be processed by the trained target model, the coordinates of key points in the target image of the meter are outputted, and then the pointer reading in the target image of the meter is determined based on the obtained coordinates. This can achieve automatic determination of the pointer reading in the meter based on the image of the meter, reduce manual operations and improve efficiency. On the other hand, it can avoid possible misoperations during manual operations, which is beneficial for improving accuracy.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 1 is a schematic flowchart illustrating a meter recognition method according to an embodiment of the present disclosure.

FIG. 3 is a schematic flowchart illustrating another meter recognition method according to an embodiment of the present disclosure.

DETAILED DESCRIPTION OF THE EMBODIMENTS

Figure 2:
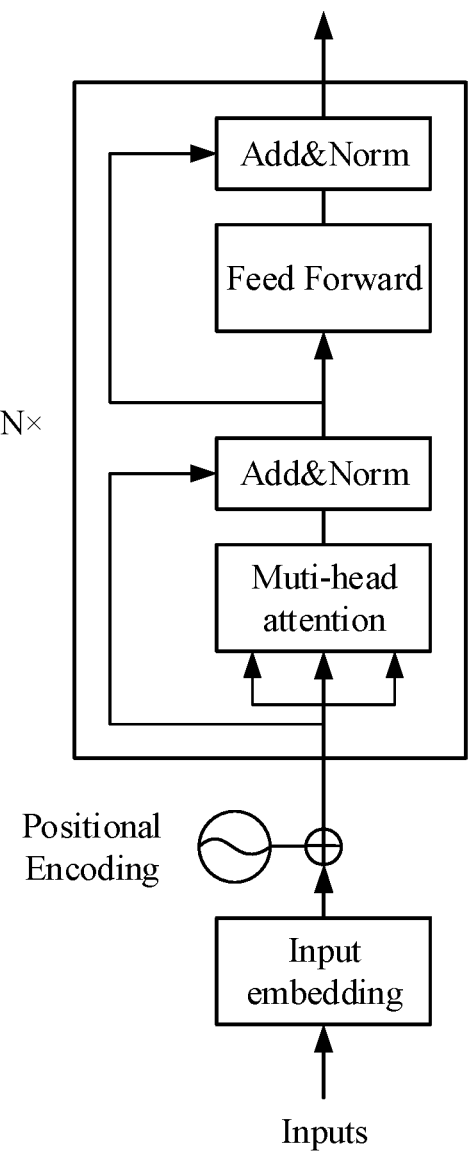
FIG. 2 is a schematic diagram illustrating an encoder according to an embodiment of the present disclosure.

The following will provide a clear and complete description of the technical solution in the embodiment of the present disclosure in conjunction with the accompanying drawings. It is evident that the described embodiments are only a part of the embodiments of the present disclosure, not all of them. Based on the embodiments in the present disclosure, all other embodiments obtained by ordinary skilled in the art without creative labor fall within the scope of protection in the present disclosure.

The terms used in the embodiments of the present disclosure are solely for the purpose of describing specific embodiments, and are not intended to limit the embodiments of the present disclosure. The singular forms of "a" and "the" used in the embodiments and the appending claims of the present disclosure are also intended to include the majority form, unless the context clearly indicates other meanings. It should also be understood that the term "and/ or" used herein refers to and includes any or all possible combinations of one or more related listed items.

It should be understood that although the terms first, second, third, etc. may be used to describe various information in the embodiments of the present disclosure, such information should not be limited to these terms. These terms are only used to distinguish the same type of information from each other. For example, without departing from the scope of the embodiments of the present disclosure, a first target sub-model can also be referred to as a second target sub-model, and similarly, a second target sub-model can also be referred to as a first target sub-model. Depending on the context, the word "if" as used herein may be interpreted as "when" or "upon" or "in response to determining".

For the purpose of brevity and ease of understanding, the terms used herein to represent size relationships are "greater than" or "less than," "higher than" or "lower than." But for those skilled in the art, it can be understood that the term "greater than" also covers the meaning of "greater than or equal to," and "less than" also covers the meaning of "less than or equal to." The term "higher than" encompasses the meaning of "higher than or equal to," while "lower than" also encompasses the meaning of "lower than or equal to."

FIG. 1 is a schematic flowchart illustrating a meter recognition method according to an embodiment of the present disclosure. The method shown in this embodiment can be applied to an electronic device equipped with a processor. The steps in the following embodiments can mainly be executed by the processor, where the electronic device includes but is not limited to a terminal, a server, etc. The terminal can be a mobile phone, a tablet, a wearable device, etc., and the server can be a local service, a cloud server, etc.

As shown in FIG. 1, the meter recognition method includes the following steps:

In step S101, embedded features of pixels in a target image of a meter are determined, and position information of the pixels is encoded to obtain encoded position features, wherein the target image of the meter contains a plurality of key points related to a meter pointer as labels.

In step S102, superimposed features obtained by superimposing the encoded position features and the embedded features are input into an encoder of a target model.

An input of the target model includes the labels, and an output of the target model includes coordinates of the key points in a sample image of the meter.

The encoder includes a multi-head self-attention layer, and the target model is used to encode the superimposed features to obtain encoded features, and the coordinates of the key points in the target image of the meter are determined based on the encoded features.

In one implementation, a plurality of sample images of the meter can be collected first, and then a training sample set can be constructed based on the sample image of the meters, and then the target model can be trained based on the training sample set.

For example, before inputting the superimposed features obtained by superimposing the encoded position features and the embedded features into the target model, the method further includes:

determining sample embedded features of pixels in a sample image of the meter, and encoding sample position information of the pixels to obtain encoded position features, wherein the sample image of the meter contains a plurality of sample key points related to the meter pointer as sample labels;

inputting sample superimposed features obtained by superimposing the sample encoded position features and the sample embedded features into the encoder to obtain the sample encoded features;

determining a training sample set based on obtaining the sample encoded features from the plurality of sample images of the meter;

training an initial model based on the sample encoded features in the training sample set to obtain a target model, wherein the sample model includes the encoder, the input of the sample model includes the labels, and the output of the sample model at least includes the coordinates of the sample key points in the sample image of the meter.

Based on this, the trained target model can determine the embedded features of pixels in the target image of the meter that needs to determine reading, and can also encode the position information of the pixels to obtain encoded position features.

For example, the key points can be determined as labels in the target image of the meter, for example, the key points include at least one of the following: a starting position of a dial reading, an ending position of the dial reading, a midpoint position of the dial reading, a starting position of the meter pointer, and an ending position of the meter pointer.

It should be noted that the key points selected as labels can be set as needed. In this example, the above 5 key points are selected as labels is only one implementation of the method.

Next, the pixels in the target image of the meter can be flattened into one dimension (either horizontally or vertically), and the embedded features of the pixels can be calculated through a fully connected layer, for example, the embedded features are in d dimensions.

In order to determine the encoded position features of the pixels, the flattened pixels can be assigned with numbers, and then randomly initialized based on the numbers of the pixels to obtain the encoded position features. For example, the dimensions of the encoded position features are the same as those of the embedded features, which are also in d dimensions.

Then, the encoded position features and embedded features can be superimposed to obtain the superimposed features, such as concating the encoded position features and embedded features.

Furthermore, the encoder of the target model can process the superimposed features to obtain one or more tensors. The target model can further process the tensors to output the coordinates of the key points in the target image of the meter, and then determine the pointer reading in the target image of the meter based on the obtained coordinates.

According to the embodiments of the present disclosure, the image of the meter can be processed by the trained target model, the coordinates of key points in the target image of the meter are outputted, and then the pointer reading in the target image of the meter is determined based on the obtained coordinates. This can achieve automatic determination of the pointer reading in the meter based on the image of the meter, reduce manual operations and improve efficiency. On the other hand, it can avoid possible misoperations during manual operations, which is beneficial for improving accuracy.

In addition, the encoder of the target model includes a multi-head self-attention layer. The multi-head self-attention layer can project three main parameters Q (query vector sequence), K (key vector sequence), and V (value vector sequence) in the attention layer through h different linear transformations, where h is the number of heads in the multi heads. The multi-head self-attention layer maps Q and K to different subspaces of high-order space a to calculate similarities. The calculated results are normalized as weights and multiplied by V, and then the attention information in different subspaces is spliced (such as concat). This reduces the dimension of each vector when calculating the attention of each head, which is beneficial to avoid the problem of overfitting in the process of training the target model.

FIG. 2 is a schematic diagram illustrating an encoder according to an embodiment of the present disclosure.

As shown in FIG. 2, the initial input of the encoder is Inputs, such as the target image of the meter. Then, the embedded features of the pixels in the target image of the meter can be determined as Input Embedding, and the encoded position features of the pixels can also be determined as Position Encoding. Then, the superimposed features obtained by superimposing the encoded position features and the embedded features can be input into the encoder of the target model. The N on the left side of the encoder refers to connecting N encoders for multiple processing of superimposed features.

The encoder can include not only a multi-head self-attention layer, but also a feed forward layer, an Add & Norm layer. The output and input of the multi-head self-attention layer can be processed by the Add & Norm layer, and then input into the Feed Forward layer. The output and input of the Feed Forward layer can be processed by the Add & Norm layer to obtain output of encoded features.

FIG. 3 is a schematic flowchart illustrating another meter recognition method according to an embodiment of the present disclosure. As shown in FIG. 3, in one embodiment, determining embedded features of pixels in a target image of a meter, and encoding position information of the pixels to obtain encoded position features includes the following steps.

In step S301, the target image of the meter is divided into a plurality of blocks.

In step S302, embedded features of pixels in each of the blocks of the image are determined, and position information of the pixels is encoded to obtain encoded position features.

In one implementation, with improvement of photography and display technology, the resolutions of the images are also growing, and the numbers of pixels in the images are also increasing. The image of the meter in the present disclosure can contain a large number of pixels, while the encoded features obtained by processing a large number of pixels with an encoder have relatively low accuracy in image semantic representation.

Therefore, according to this embodiment, the target image of the meter can be first divided into a plurality of blocks, such as a plurality of regular blocks or irregular blocks. For each block of image, one-dimensional flattening can be performed in the same way to obtain embedded features. Taking blocks divided into regular blocks as an example, for example, they can be divided into 3×3=9 blocks, for example, can be divided into 8×8=64 blocks, and so on.

Thus, embedded features and encoded position features can be determined for each block of image, to obtain superimposed features. Since semantics represented by superimposed features are specific to a single block of image and correspond to a small number of pixels, the accuracy of representation is relatively high. Therefore, the encoded features processed by the encoder have a relatively high accuracy in image semantic representation.

In the case of dividing the target image of the meter into a plurality of blocks, the substantial process of obtaining embedded features will be described below with reference to an example.

For example, the target image of the meter is divided into n blocks, respectively $X_1$ to $X_n$, and the corresponding encoded position features are $E_{pos1}$ to $E_{posn}$. Each block is processed through a fully connected layer $E_d$ to obtain embedded features, and d represents the dimensions of the embedded features processed through the fully connected layer as d dimensions. For example, the fully connected layer can successively include a linear layer liner, a linear rectification layer Relu (which can serve as an activation function, or other activation function can be used as required), and a batch normalization layer Batch Norm.

Thus, for the target image of the meter, the method of obtaining superimposed feature Z through concat can be as follows:

$$Z = concat(X_1 E_d + E_{pos1}, X_2 E_d + E_{pos2}, \ldots , X_n E_d + E_{posn}).$$

For example, in the case of batch processing, the number of target images of the meters processed each time is denoted as batchsize, which is greater than or equal to 1. The sizes of the target images of the meter are the same 256*256, which means the number of horizontal or vertical pixels is 256.

Thus, the size of the image input into the target model can be batchsize*3*256*256, where 3 represents three color channels of the pixels, such as RGB (red, green, and blue) channels. For example, the target image of the meter is divided into 8×8=64 blocks, the input dimensions of the encoder are 128, so the size can be changed as follows:

First, batchsize*3*256*256 is converted to batchsize*3*8*8*32*32, then the dimensionality of 32*32 is further reduced to 128*1, and finally converted to batchsize*3*64*128.

This process can be understood as a dimensionality reduction process, where the encoded features obtained after being processed by the encoder can represent the semantics of each block of image and be used to determine the labels in each block of image. As the labels correspond to key points, the coordinates of the key points can be further determined after determining the labels.

In one example, the encoder includes a plurality of sequentially connected sub-encoders, and the target model also includes a feature pyramid.

Each of the sub-encoders outputs encoded results based on the input encoded features, and inputs the encoded results into the feature pyramid to obtain a plurality of encoded features. Here, the size information corresponding to the encoded features input to each sub-encoder is different, and the size information corresponding to the encoded results output from each sub-encoder is different.

Since a target image of the meter has only one size, such as 256*256 in the above embodiment, the encoded feature determined for an image of one size is relatively weak in expressing semantic information. In order to overcome this problem, the target image of the meter can be processed. For example, a plurality of sub-encoders can process the encoded features without size information separately, so that a plurality of encoded results with different size information can be obtained. Then the plurality of encoded results obtained by comprehensive consideration can express relatively strong semantic information.

But according to the encoded result, although the semantic information is strong, the position information is weak. In this example, the encoded results output by each sub-encoder can be further input into the feature pyramid for processing to enrich the position information of the final output encoded features.

In one example, each sub-encoder is connected to a linear layer, and the linear layer is used to reduce the dimensionality of the encoded results output by the encoder and input the dimensionality reduced encoded results into the next sub-encoder.

Figure 4:
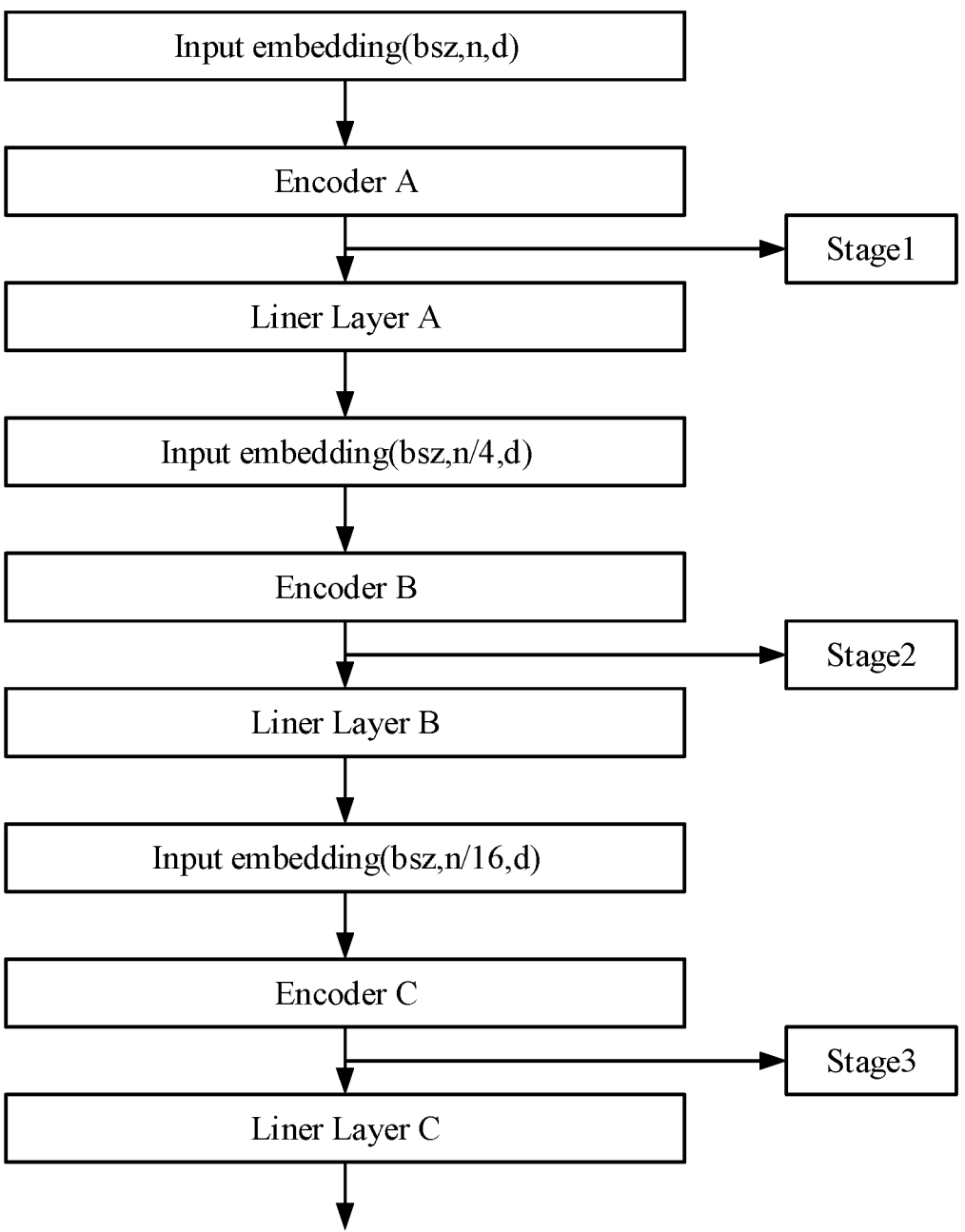
FIG. 4 is a schematic diagram illustrating a seed encoder according to an embodiment of the present disclosure.

FIG. 4 is a schematic diagram illustrating a seed encoder according to an embodiment of the present disclosure.

In one embodiment, the embedded feature part of the encoded feature is mainly explained. For example, the encoder includes three sub-encoders, namely encoder A, encoder B, and encoder C. Encoder A connects to the linear layer Liner Layer A, encoder B connects to the linear layer Liner Layer B, and encoder C connects to the linear layer Liner Layer C.

For example, the embedded feature input into the sub-encoder encoder A is embedding (bsz, n, d), and the size information is (bsz, n, d). After processing by the sub-encoder encoder A, the size information of encoded results stage1 is (bsz, n, d). Furthermore, the linear layer Liner Layer A performs dimensionality reduction on the encoded results stage1, which can adjust the size information of the encoded results stage1. For example, by adjusting the size information to (bsz, n/4, d), the dimensionality reduced encoded results can be input into the next sub-encoder encoder B.

Here, bsz is the abbreviation for batchsize, n represents the target image of the meter divided into n blocks, and d represents the dimension of the embedded features.

Furthermore, the embedded features embedded (bsz, n/4, d) after adjusting the size information can be input into the sub-encoder encoder B, with the size information being (bsz, n/4, d). After processing by the sub-encoder encoder B, the size information of the encoded results stage2 is (bsz, n/4, d). Then, through the linear layer Liner Layer B, the encoded results stage2 is dimensionally reduced, and the size information of the encoded results stage2 can be adjusted, for example adjusted to (bsz, n/16, d), and then the dimensionally reduced encoded results can be input into the next sub-encoder encoder C.

Furthermore, the embedded features embedded (bsz, n/16, d) after adjusting the size information can be input into the sub-encoder encoder C, with the size information being (bsz, n/16, d). After being processed by the sub-encoder encoder C, the size information of the encoded results stage3 is (bsz, n/16, d). Furthermore, by performing dimensionality reduction on the encoded results stage3 through the linear layer Liner Layer C, the size information of the encoded results stage3 can be adjusted, s for example adjusted to (bsz, n/16, d). Encoder C is the last sub-encoder, and the output can be disconnected from the linear layer.

Figures 5, 6:
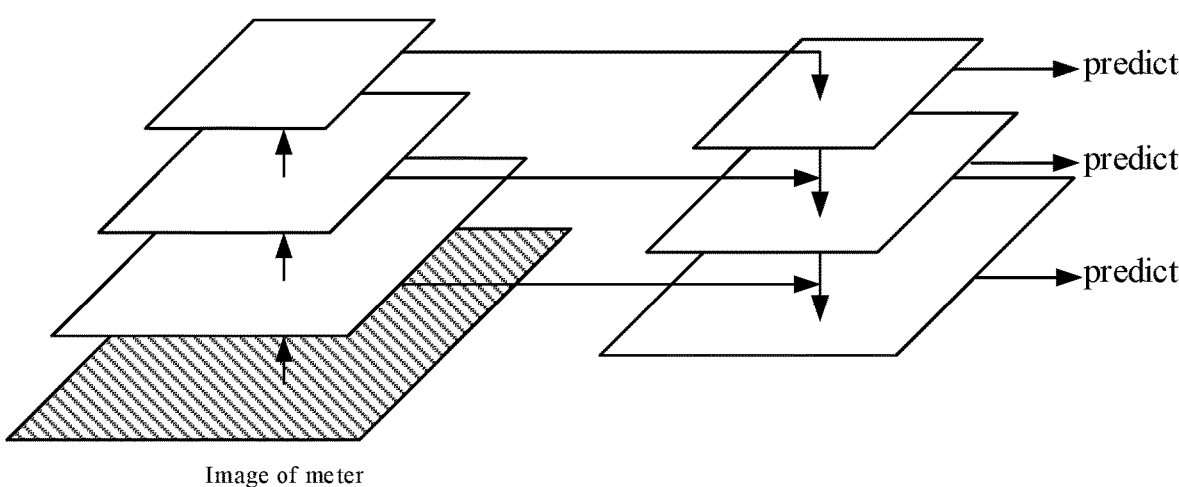
FIG. 5 is a schematic diagram illustrating a feature pyramid according to an embodiment of the present disclosure.
FIG. 6 is a schematic block diagram illustrating an apparatus for meter recognition according to an embodiment of the present disclosure.

FIG. 5 is a schematic diagram illustrating a feature pyramid according to an embodiment of the present disclosure.

As shown in FIG. 5, the processing process from bottom to top for the target image of the meter is equivalent to a bottom-up feature convolution, which can be implemented through a plurality of sub-encoders, such as the three sub-encoders shown in FIG. 4.

Furthermore, for the highest feature layer in the feature layer, such as the top left layer in FIG. 5, it can be processed from top to bottom as shown in FIG. 5. For example, upsampling can be performed to double the size of the features, and convolution can be performed on the lower layer (such as 1×1 convolution) to change the number of channels, and then the expanded features and the features after the convolution change of the number of channels are added.

Similarly, as shown in FIG. 5, three layers are sequentially determined from top to bottom, and the output of each layer is called a prediction result predict. For the output of the three layers, the fused features can be further concatenated through a fully connected layer, such as concatenating the size information n, n/4, and n/16 to obtain a dimension of the fused feature's size information as (n+n/4+n/16).

Based on this, position features are concatenated in strong semantic information to ensure that the encoded features are more comprehensive and accurate for the representation of image of the meters.

In one implementation, the output of the target model further includes at least one of the following:

a type of the target image of the meter; coordinates of at least two diagonal points in an external quadrilateral of the meter in the target image of the meter.

In addition to outputting the coordinates of key points in the target image of the meter, by constructing the initial model during the training process, the target model can also enable the trained target model to output the type of target meter image, the coordinates of at least two diagonal points in the external quadrilateral of the meter in the target image of the meter, and so on.

Here, based on the type of the target image of the meter output by the target model, it can be determined whether the type of the target image of the meter is an image of the meter. If it does not include a meter, then the type is not an image of the meter. In this case, the processing of the target model can be paused to avoid wasting memory.

Based on the coordinates of at least two diagonal points in the external quadrilateral of the meter in the target image of the meter output by the target type, the position of the meter in the target image can be determined, which is conducive to accurately determining the coordinates of key points in the target image of the meter subsequently.

In one implementation, the target model includes a first target sub-model, a second target sub-model, and a third target sub-model;

wherein the input of the first target sub-model includes the fused features, and the output includes the type of the target image of the meter;

The input of the second target sub-model includes the fused features, and the output includes the coordinates of at least two diagonal points in the external quadrilateral of the meter in the target image of the meter.

The input of the third target sub-model includes the fused features, and the output includes the coordinates of the key points in the target image of the meter.

In one implementation, a plurality of sub-models can be constructed to form the target model, such as a first target sub-model, a second target sub-model, and a third target sub-model.

The input of the three sub-models can be the fused features mentioned above, and the fully connected layers in the sub-models can be set according to the required output. For example:

The size information tensor1 of the fully connected layer in the first target sub-model is (bsz, (n+n/4+n/16)*d, 2), where the third dimension 2 indicates that two results can be output, such as 1 and 0.1 indicates that the target image of the meter contains a meter, and 0 indicates that the target image of the meter contains no meter.

The size information tensor2 of the fully connected layer in the second target sub-model is (bsz, (n+n/4+n/16)*d, 4), where the third dimension 4 represents the ability to output 4 results, for example, every 4 results forming the two coordinates of the diagonal points mentioned above.

The size information tensor3 of the fully connected layer in the third target sub-model is (bsz, (n+n/4+n/16)*d, 10), where the third dimension 10 represents the ability to output 4 results, for example, every 10 results forming the coordinates of the 5 key points mentioned above.

The first target sub-model can implement classification tasks, and the type of loss function used can be cross entropy. The second target sub-model can implement regression tasks, and the type of loss function used can be L1 loss. The third target sub-model can implement regression tasks, and the type of loss function used can be L1 loss.

It should be noted that the relationship between each encoded feature and the sub-model is not limited to those described in the above implementations, and can be modified as needed.

Correspondingly to the embodiments of the above meter recognition method, an embodiment of the present disclosure also provides an embodiment of a meter recognition apparatus.

An embodiment of the present disclosure also provides a meter recognition apparatus, which can be apply to an electronic device equipped with a processor. The steps in the following embodiments can mainly be executed by the processor, wherein the electronic device includes but is not limited to a terminal, a server, for example, a mobile phone, a tablet, a wearable device, and the like, and the server is, for example, a local service, a cloud server, and the like.

In one embodiment, the meter recognition apparatus includes one or more processors configured to perform:

determining embedded features of pixels in a target image of a meter, and encoding position information of the pixels to obtain encoded position features, wherein the target image of the meter contains a plurality of key points related to a meter pointer as labels;

inputting superimposed features obtained by superimposing the encoded position features and the embedded features into an encoder of a target model;

wherein an input of the target model includes the labels, and an output of the target model includes coordinates of the key points in a sample image of the meter.

The encoder includes a multi-head self-attention layer, and the target model is used to encode the superimposed features to obtain encoded features, and coordinates of the key points in the target image of the meter are determined based on the encoded features.

In one implementation, the processor is further configured to perform:

determining sample embedded features of pixels in the sample image of the meter, and encoding sample position information of the pixels to obtain encoded position features, wherein the sample image of the meter contains a plurality of sample key points related to the meter pointer as sample labels;

inputting sample superimposed features obtained by superimposing the sample encoded position features and the sample embedded features into the encoder to obtain the sample encoded features;

determining a training sample set based on obtaining the sample encoded features from the plurality of sample images of the meter;

training an initial model based on the sample encoded features in the training sample set to obtain a target model, wherein the sample model includes the encoder, the input of the sample model includes the labels, and the output of the sample model at least includes the coordinates of the sample key points in the sample image of the meter.

In one implementation, the key points include at least one of the following: a starting position of a dial reading, an ending position of the dial reading, a midpoint position of the dial reading, a starting position of the meter pointer, and an ending position of the meter pointer.

In one implementation, the processor is configured to perform:

dividing the target image of the meter into a plurality of blocks;

determining embedded features of pixels in each of the blocks of the image and encoding the position information of the pixels to obtain encoded position features.

In one implementation, the encoder includes a plurality of sequentially connected sub-encoders, and the target model also includes a feature pyramid.

Each of the sub-encoders outputs encoded results based on the input encoded features, and inputs the encoded results into the feature pyramid to obtain fused features. Here, the size information corresponding to the encoded results output by each sub-encoder is different, and the size information corresponding to the encoded features input to each sub-encoder is different.

In one implementation, each sub-encoder is connected to a linear layer, and the linear layer is used to reduce the dimensionality of the encoded results output by the encoder and input the dimensionality reduced encoded results into the next sub-encoder.

In one implementation, the output of the target model further includes at least one of the following: a type of the target image of the meter; coordinates of at least two diagonal points in an external quadrilateral of the meter in the target image of the meter.

In one implementation, the target model includes a first target sub-model, a second target sub-model, and a third target sub-model;

wherein the input of the first target sub-model includes the fused features, and the output includes the type of the target image of the meter.

The input of the second target sub-model includes the fused features, and the output includes the coordinates of at least two diagonal points in the external quadrilateral of the meter in the target image of the meter;

The input of the third target sub-model includes the fused features, and the output includes the coordinates of the key points in the target image of the meter.

Regarding the apparatus in the above embodiment, the specific ways in which each module performs operations have been described in detail in the relevant method embodiment, and will not be elaborated here.

Since the apparatus embodiment substantially correspond to the method embodiment, a reference may be made to part of the descriptions of the method embodiment for the related part. The apparatus embodiment described above are merely illustrative, where the modules described as separate members may be or not be physically separated, and the members displayed as modules may be or not be physical units, e.g., may be located in one place, or may be distributed to a plurality of network modules. Part or all of the modules may be selected according to actual requirements to implement the objectives of the solutions in the description. Those of ordinary skill in the art may understand and carry out them without creative work.

An embodiment of the present disclosure further provides an electronic device, including: a processor; a memory used to store computer programs; wherein, when the computer program is executed by the processor, the meter recognition method described in any of the above embodiments is implemented.

An embodiment of the present disclosure also provides a computer-readable storage medium for storing computer programs, which, when executed by a processor, implements the steps in the meter recognition method described in any of the above embodiments.

FIG. 6 is a schematic block diagram illustrating an apparatus 1400 for meter recognition according to an embodiment of the present disclosure. Fox example, the apparatus 600 may be a mobile phone, a computer, a digital broadcast terminal, a message transceiver, a game console, a tablet device, a medical device, fitness equipment, a personal digital assistant or the like.

Referring to FIG. 6, the apparatus 600 may include one or more following components: a processing component 602, a memory 604, a power component 606, a multimedia component 608, an audio component 610, an input/output (I/O) interface 612, a sensor component 66 and a communication component 616.

The processing component 602 typically controls overall operations of the apparatus 600, such as the operations associated with display, telephone calls, data communications, camera operations and recording operations. The processing component 602 may include one or more processors 620 to execute instructions to perform all or part of the steps in the above-described methods for receiving reference signals. Moreover, the processing component 602 may include one or more modules which facilitate the interaction between the processing component 602 and other components. For example, the processing component 602 may include a multimedia module to facilitate the interaction between the multimedia component 608 and the processing component 602.

The memory 604 is configured to store various types of data to support the operation of the apparatus 600. Examples of such data include instructions for any applications or methods operated on the apparatus 600, contact data, phonebook data, messages, pictures, video, etc. The memory 604 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the apparatus 600. The power component 606 may include a power management system, one or more power sources, and any other components associated with the generation, management, and distribution of power in the apparatus 600.

The multimedia component 608 includes a screen providing an output interface between the apparatus 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and/or the rear camera may receive an external multimedia datum while the apparatus 600 is in an operation mode, such as a photographing mode or a video mode. Each of the front and rear cameras may be a fixed optical lens system or have a focus and optical zoom capability.

The audio component 610 is configured to output and/or input audio signals. For example, the audio component 610 includes a microphone (MIC) configured to receive an external audio signal when the apparatus 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 66 includes one or more sensors to provide status assessments of various aspects of the apparatus 600. For instance, the sensor component 66 may detect an open/closed status of the apparatus 600, relative positioning of components, e.g., the display and the keypad, of the apparatus 600, a change in position of the apparatus 600 or a component of the apparatus 600, a presence or absence of user's contact with the apparatus 600, an orientation or an acceleration/deceleration of the apparatus 600, and a change in temperature of the apparatus 600. The sensor component 66 may include a proximity sensor configured to detect the presence of nearby objects without any physical contact. The sensor component 66 may also include a light sensor, such as a CMOS or CCD image sensor, for use in imaging applications. In some embodiments, the sensor component 66 may also include an accelerometer sensor, a gyroscope sensor, a magnetic sensor, a pressure sensor or a temperature sensor.

The communication component 616 is configured to facilitate communication, wired or wirelessly, between the apparatus 600 and other devices. The apparatus 600 can access a wireless network based on a communication standard, such as WiFi, 2G, 3G, 4G LTE, 5G NR or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications.

In exemplary embodiments, the apparatus 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods for receiving reference signals.

In exemplary embodiments, there is also provided a non-transitory computer-readable storage medium including instructions, such as included in the memory 604, executable by the processor 620 in the apparatus 600, for performing the above-described methods for receiving reference signals. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the embodiments disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

It should be noted that herein, relational terms such as first and second are only used to distinguish one entity or operation from another entity or operation, and do not necessarily require or imply any actual relationship or order between these entities or operations. The terms "comprising," "including", or any other variation thereof are intended to encompass non-exclusive inclusion, such that a process, method, item, or device that includes a series of elements not only includes those elements, but also other elements that are not explicitly listed, or also include elements inherent in such a process, method, item, or device. Without further limitations, the elements limited by the statement "including one . . . " do not exclude the existence of other identical elements in the process, method, item, or equipment that includes the said elements.

The above provides a detailed introduction to the methods and apparatus provided in the embodiments of the present disclosure. Specific examples are applied herein to explain the principles and implementation methods of the present disclosure. The explanations of the above embodiments are only used to help understand the methods and core ideas of the present disclosure. In addition, for those skilled in the art, there may be changes in specific implementation methods and application scope based on the ideas of the present disclosure. Accordingly, the content of this specification should not be understood as a limitation of the present disclosure.

What is claimed is:

1. A meter recognition method comprising:

determining embedded features of pixels in a target image of a meter, and encoding position information of the pixels to obtain encoded position features, wherein the target image of the meter contains a plurality of key points related to a meter pointer as labels;

inputting superimposed features obtained by superimposing the encoded position features and the embedded features into an encoder of a target model;

wherein an input of the target model comprises the labels, and an output of the target model comprises coordinates of key points in a sample image of the meter;

the encoder comprises a multi-head self-attention layer, and the target model is used to encode the superimposed features to obtain encoded features, and coordinates of the key points in the target image of the meter are determined based on the encoded features;

wherein before inputting superimposed features obtained by superimposing the encoded position features and the embedded features into an encoder of a target model, the method further comprises:

determining sample embedded features of pixels in the sample image of the meter, and encoding sample position information of the pixels to obtain encoded position features, wherein the sample image of the meter contains a plurality of sample key points related to the meter pointer as sample labels;

inputting sample superimposed features obtained by superimposing the sample encoded position features and the sample embedded features into the encoder to obtain the sample encoded features;

determining a training sample set based on obtaining the sample encoded features from the plurality of sample images of the meter;

training an initial model based on sample encoded features in the training sample set to obtain a target model, wherein the sample model comprises the encoder, an input of the sample model comprises the labels, and an output of the sample model at least comprises coordinates of the sample key points in the sample image of the meter.

2. The method according to claim 1, wherein the key points comprise at least one of:

a starting position of a dial reading, an ending position of the dial reading, a midpoint position of the dial reading, a starting position of a meter pointer, and an ending position of the meter pointer.

3. The method according to claim 1, wherein determining embedded features of pixels in a target image of a meter, and encoding position information of the pixels to obtain encoded position features comprising:

dividing the target image of the meter into a plurality of blocks;

determining embedded features of pixels in each of the blocks of the image and encoding position information of the pixels to obtain encoded position features.

4. The method according to claim 3, wherein the encoder comprises a plurality of sequentially connected sub-encoders, and the target model further comprises a feature pyramid;

each of the sub-encoders outputs encoded results based on the input encoded features, and inputs the encoded results into the feature pyramid to obtain fused features, wherein size information corresponding to the encoded results output by each sub-encoder is different, and size information corresponding to the encoded features input to each sub-encoder is different.

5. The method according to claim 4, wherein each of the sub-encoders is connected to a linear layer, the linear layer is used to reduce dimensionality of the encoded results output by the encoder and input the dimensionality reduced encoded results into a next sub-encoder.

6. The method according to claim 4, wherein the output of the target model further comprises at least one of:

a type of the target image of the meter; coordinates of at least two diagonal points in an external quadrilateral of the meter in the target image of the meter.

7. The method according to claim 6, wherein the target model comprises a first target sub-model, a second target sub-model, and a third target sub-model;

wherein an input of the first target sub-model comprises the fused features, and an output comprises a type of the target image of the meter;

an input of the second target sub-model comprises the fused features, and an output comprises coordinates of at least two diagonal points in the external quadrilateral of the meter in the target image of the meter;

an input of the third target sub-model comprises the fused features, and an output comprises coordinates of the key points in the target image of the meter.

8. An electronic device comprising:

a processor;

a memory used to store a computer program;

wherein when the computer program is executed by the processor, the meter recognition method according to claim 1 is implemented.

9. A non-transitory computer-readable storage medium for storing a computer program, wherein when the computer program is executed by a processor, steps in the meter recognition method according to claim 1 are implemented.

10. A meter recognition apparatus, comprising one or more processors configured to perform:

determining embedded features of pixels in a target image of a meter, and encoding position information of the pixels to obtain encoded position features, wherein the target image of the meter contains a plurality of key points related to a meter pointer as labels;

inputting superimposed features obtained by superimposing the encoded position features and the embedded features into an encoder of a target model;

wherein an input of the target model comprises the labels, and an output of the target model comprises coordinates of key points in a sample image of the meter;

the encoder comprises a multi-head self-attention layer, and the target model is used to encode the superimposed features to obtain encoded features, and coordinates of the key points in the target image of the meter are determined based on the encoded features;

wherein the processor is further configured to perform:

determining sample embedded features of pixels in the sample image of the meter, and encoding sample position information of the pixels to obtain encoded position features, wherein the sample image of the meter contains a plurality of sample key points related to the meter pointer as sample labels;

inputting sample superimposed features obtained by superimposing the sample encoded position features and the sample embedded features into the encoder to obtain the sample encoded features;

determining a training sample set based on obtaining the sample encoded features from the plurality of sample images of the meter;

training an initial model based on sample encoded features in the training sample set to obtain a target model, wherein the sample model comprises the encoder, an input of the sample model comprises the labels, and an output of the sample model at least comprises coordinates of the sample key points in the sample image of the meter.

11. The apparatus according to claim 10, wherein the key points comprise at least one of:

a starting position of a dial reading, an ending position of the dial reading, a midpoint position of the dial reading, a starting position of a meter pointer, and an ending position of the meter pointer.

12. The apparatus according to claim 10, wherein the processor is configured to perform:

dividing the target image of the meter into a plurality of blocks;

determining embedded features of pixels in each of the blocks of the image and encoding position information of the pixels to obtain encoded position features.

13. The apparatus according to claim 12, wherein the encoder comprises a plurality of sequentially connected sub-encoders, and the target model further comprises a feature pyramid;

each of the sub-encoders outputs encoded results based on the input encoded features, and inputs the encoded results into the feature pyramid to obtain fused features, wherein size information corresponding to the encoded results output by each sub-encoder is different, and size information corresponding to the encoded features input to each sub-encoder is different.

14. The apparatus according to claim 13, wherein each of the sub-encoders is connected to a linear layer, the linear layer is used to reduce dimensionality of the encoded results output by the encoder and input the dimensionality reduced encoded results into a next sub-encoder.

15. The apparatus according to claim 13, wherein the output of the target model further comprises at least one of:

a type of the target image of the meter; coordinates of at least two diagonal points in an external quadrilateral of the meter in the target image of the meter.

16. The apparatus according to claim 15, wherein the target model comprises a first target sub-model, a second target sub-model, and a third target sub-model;

wherein an input of the first target sub-model comprises the fused features, and an output comprises a type of the target image of the meter;

an input of the second target sub-model comprises the fused features, and an output comprises coordinates of at least two diagonal points in the external quadrilateral of the meter in the target image of the meter;

an input of the third target sub-model comprises the fused features, and an output comprises coordinates of the key points in the target image of the meter.

17. A meter recognition method comprising:

determining embedded features of pixels in a target image of a meter, and encoding position information of the pixels to obtain encoded position features, wherein the target image of the meter contains a plurality of key points related to a meter pointer as labels;

inputting superimposed features obtained by superimposing the encoded position features and the embedded features into an encoder of a target model;

wherein an input of the target model comprises the labels, and an output of the target model comprises coordinates of key points in a sample image of the meter;

the encoder comprises a multi-head self-attention layer, and the target model is used to encode the superimposed features to obtain encoded features, and coordinates of the key points in the target image of the meter are determined based on the encoded features;

wherein determining embedded features of pixels in a target image of a meter, and encoding position information of the pixels to obtain encoded position features comprising:

dividing the target image of the meter into a plurality of blocks;

determining embedded features of pixels in each of the blocks of the image and encoding position information of the pixels to obtain encoded position features;

wherein the encoder comprises a plurality of sequentially connected sub-encoders, and the target model further comprises a feature pyramid;

each of the sub-encoders outputs encoded results based on the input encoded features, and inputs the encoded results into the feature pyramid to obtain fused features, wherein size information corresponding to the encoded results output by each sub-encoder is different, and size information corresponding to the encoded features input to each sub-encoder is different.

* * * * *